Figure 1:
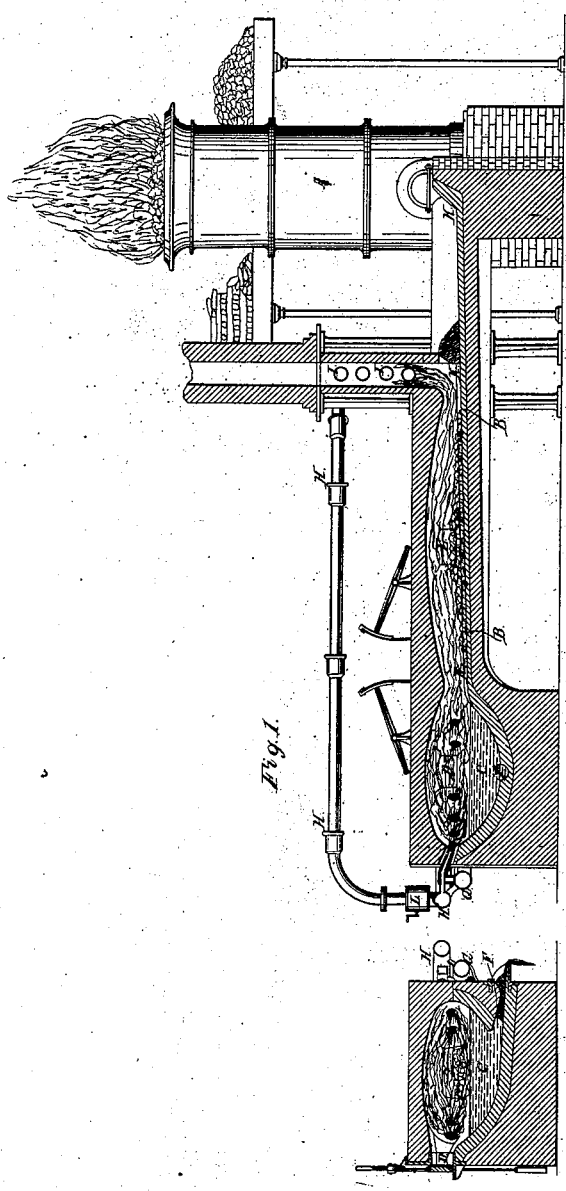

J. M. Heath.
Making Cast Steel.

Nº 4,822.                                    Patented Oct. 24, 1846.

UNITED STATES PATENT OFFICE.

JOSIAH M. HEATH, OF LONDON, ENGLAND.

IMPROVEMENT IN THE MANUFACTURE OF STEEL.

Specification forming part of Letters Patent No. 4,822, dated October 24, 1846.

*To all whom it may concern:*

Be it known that I, JOSIAH MARSHALL HEATH, a subject of the Queen of Great Britain, and now residing at Winchester Buildings, in the city of London, county of Middlesex, in the said Kingdom, iron-master, have invented or discovered a new and useful invention of Improvements in the Manufacture of Cast-Steel; and I do hereby declare that the following is a full and exact description thereof.

The process now universally in use for making cast-steel is to reduce pig-iron of suitable quality into bars of malleable iron, to convert these bars into blistered steel, and to melt the blistered steel, broken into fragments, in close crucibles, and to pour the fluid steel into iron molds. The expense attending these different processes is enormous. If the cost of pig-iron of a quality suitable for good steel be eight pounds a ton, the cost of cast-steel in ingots made from such pig-iron by the usual process will amount to upward of thirty pounds, or four times the cost of the pig-iron.

I have discovered a process by which the conversion of pig into bar-iron, of bar-iron into blistered steel, and the use of crucibles for melting the blistered steel may be dispensed with, and cast-steel may be manufactured at a cost far below that of the old process. This is done by melting together of mixture of pig-iron and malleable iron in such proportions that the fluid mass arising from the mixture shall contain just that amount of carbon which, when combined with iron, forms steel.

The process I now use is described as follows: The pig-iron to be converted into steel may be melted in a cupola, or it may be run direct from a blast-furnace used for smelting iron ore; but the most suitable apparatus I consider to be a common cupola-furnace, blown with hot air, in order that the metal, when run from it, may retain the highest possible temperature. The fluid pig-iron should be run from the cupola or other furnace into a receptacle made of any material capable of withstanding an intense heat, similar in form to a common refinery or to the shallow well of a reverberatory furnace for melting pig-iron, and the quantity of fluid pig-iron used for one operation should occupy about one-third, or thereabout, of the capacity of the receptacle.

The interior of this receptacle and its contents should be kept at the highest temperature that can be produced; and I find a very ready and convenient method of producing this high temperature to be by means of currents of ignited carbonic-oxide gas conveyed through pipes placed round the top of the receptacle, slightly inclined downward, so as to bear upon the surface of the fluid metal. A sufficient temperature for this purpose may also be produced by a current of oxyhydrogen gas produced by directing a stream of atmospheric air into a current of hydrogen gas formed from the decomposition of water allowed to trickle upon malleable iron brought to a high heat. In order to burn the carbonic oxide, it is necessary to introduce along with it a current of hot atmospheric air; or, if a more intense heat is required, a current of oxygen gas may be introduced along with the carbonic-oxide gas. In either case, however, care must be taken that the proportion of atmospheric air or of oxygen gas does not exceed that which is required to convert the carbonic oxide into carbonic acid, as any excess of oxygen in the blast would have a most injurious effect upon the metal in the receptacle.

The carbonic oxide may be obtained from the waste gas from the cupola employed to melt the pig-iron, or from a blast-furnace, or it may be generated in a separate apparatus by the imperfect combustion of any fuel, and the application of it may be in any of the numerous and well-known methods already in use. The proportion of hot atmospheric air or of oxygen gas necessary to form carbonic acid may be exactly regulated by means of stop-cocks or valves in the pipes, by which the hot air or oxygen gas is conveyed into the streams of carbonic oxide.

I do not claim any method of producing the high temperature required in my process of making steel as any part of my invention.

In order to decarburate the fluid pig-iron in the receptacle to the degree necessary to form steel, I mix with it a certain portion of malleable iron, more or less as I wish to make the steel, softer or harder; but for cast-steel of a medium degree of hardness, such as is used for general purposes, I find that about equal proportions of pig and malleable iron answer best. The proportions in which the pig and malleable iron should be mixed, however, will much depend upon the quality of the former. If gray pig-iron is used, it will require more malleable iron to be mixed with it than if white pig-iron is used. This is a point the exact determination of which can only be arrived at by testing the quality of the mixed fluid metal in the receptacle at intervals.

The malleable iron to be mixed with the fluid pig-iron in the receptacle may be in scraps or in any convenient form; but by far the most economical, convenient, and purest state in which the malleable iron can be used is in the granular form produced by reducing any perfectly pure oxide of iron to small fragments, and then submitting them to the well-known process of cementation in a common converting furnace, such as is used for converting bar-iron into blistered steel. The iron ore in small fragments is mixed with just that proportion of carbonaceous matter which is sufficient to combine with its oxygen at a red heat in a close vessel, and when the process is finished the malleable iron is obtained in the purest possible state. Before adding the malleable iron to the fluid pig-iron the former must be brought to a white heat, and this may be done in a separate furnace; but I find the most convenient method is to place the malleable iron on a bed between the receptacle which holds the fluid pig-iron and the chimney up which the waste heat from the combustion of the gas passes. The malleable iron, when at a white heat, is raked into the receptacle containing the fluid pig-iron, and the whole is kept in fusion and stirred about for a sufficient time to produce intimate mixture and uniformity of composition in the fluid mass; and when the assays taken from it show that the steel is of the desired quality the contents of the receptacle are run off into molds of any form or size required. A vitreous flux should be used to defend the surface of the fluid steel from the action of the atmospheric air while it is in the receptacle; but I do not claim the use of it as any part of my invention. I find common bottle glass to answer as well as anything else.

The forms of the apparatus in which the process I have above described may be performed may be various. I have described the one I consider best adapted to the purpose; but I do not confine myself to the exclusive use of it.

In the accompanying drawings are several views of the apparatus in which I consider the process I have described may be most efficiently performed.

Figure 2:
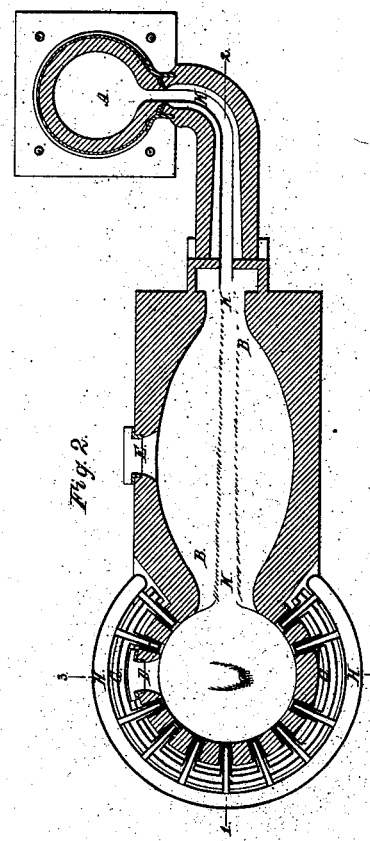

Figure 1 is a sectional plan view, (the upper part of the furnace being removed to show the interior.) Fig. 2 is a section taken in the line 1 2 of Fig. 1, and Fig. 3 a section taken in the line 3 4 of Fig. 1.

The letters in all the figures refer to the same parts of the apparatus.

A is the cupola, in which the pig-iron is melted. There is nothing peculiar in the form or size of this furnace; but I prefer the use of heated air in blowing it, in order that the metal, when run from it, may have the highest possible temperature.

B is the bed between the receptacle for the fluid metal and the chimney. The malleable iron or deoxidated iron ore is placed upon this bed on either side of the channel K. It is brought to the highest possible temperature by the passage over it of the flame from the combustion of the gas and air introduced through the pipes G and H.

C is the receptacle into which the melted pig-iron is run from the cupola, and into which the malleable iron at a white heat is raked through the door D and intimately mixed with the fluid pig-iron by stirring with a wooden pole. The temperature of the contents of the receptacle may be raised to any degree required by means of the combustion of any gas rich in carbon and hydrogen by mixing with it hot atmospheric air or oxygen gas, and the proportions required to produce perfect combustion of the gas without producing an oxidating flame may be exactly regulated by a stop cock or valve, L, placed on the pipe H. The receptacle may be of any size, according to the quantity of steel which is required. I find the most convenient gas to be used for this purpose is carbonic oxide, which may be collected from a cupola or a blast-furnace, or may be produced in a separate furnace by the imperfect combustion of any refuse fuel. The means of producing and applying this gas to the purposes of solid fuel have been frequently described and are well known.

D is the door, by which the malleable iron or deoxidated ore is introduced upon the bed B, and by which it is raked into the receptacle.

E is a small door, through which a bar of iron or a wooden pole is introduced to stir the fluid metal in the receptacle.

F is a tap-hole by which the steel is run into molds from the receptacle.

G represents pipes through which the carbonic oxide or other gas is conveyed to the receptacle. They should dip downward slightly, so that the flame from the ignited gas may play upon the contents of the receptacle and keep the whole in a fluid state.

H represents pipes through which the hot atmospheric air or oxygen gas is conveyed to be mixed with the gas in the pipes G. When atmospheric air is used, it may be heated by the waste flame which passes up the chimney in the pipes I. The method of arranging the gas and air pipes has been often described and is well known.

K is the channel through which the liquid pig-iron is run from the cupola or blast-furnace into the receptacle.

L is a valve by which the admission of hot atmospheric air or oxygen gas is regulated, so as to produce perfect combustion.

What I claim is—

The exclusive right of preparing cast-steel by decarburating pig-iron to the degree required to form steel by mixing with the pig-iron run from a cupola or other furnace into a separate receptacle malleable iron in the proportion necessary to form steel, and running the mixture of pig and malleable iron, while still fluid and in the state of cast-steel, into molds from the receptacle.

In witness whereof I, the said JOSIAH MARSHALL HEATH, have hereunto set my hand and seal this 18th day of February, 1846.

J. M. HEATH. [L. S.]

Witnesses:
W. C. WINTERBOTTOM,
2 *Winchester Building, Old Broad St.*,
FRED. WALKORN,
*Clerk to Newton & Son, Patent Agents, Chancery Lane.*